(12) United States Patent
Saha et al.

(10) Patent No.: US 6,772,176 B1
(45) Date of Patent: Aug. 3, 2004

(54) COORDINATING A DISTRIBUTED TRANSACTION BETWEEN PARTICIPANTS UNABLE TO FOLLOW A TWO-PHASE COMMIT

(75) Inventors: Debashis Saha, Menlo Park, CA (US); Amit Ganesh, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 421 days.

(21) Appl. No.: 09/715,956

(22) Filed: Nov. 17, 2000

(51) Int. Cl.[7] .................................................. G06F 7/00
(52) U.S. Cl. .......................... 707/201; 707/8; 707/10; 709/227
(58) Field of Search ..................... 707/8, 10, 6, 100, 707/204, 201, 202; 709/201, 227

(56) References Cited

U.S. PATENT DOCUMENTS

| | | | |
|---|---|---|---|
| 5,261,089 A | * 11/1993 | Coleman et al. | ............... 707/8 |
| 5,561,797 A | * 10/1996 | Gilles et al. | .................... 707/8 |
| 5,884,327 A | 3/1999 | Cotner et al. | ............... 707/202 |
| 5,920,863 A | * 7/1999 | McKeehan et al. | ........... 707/10 |
| 5,924,095 A | * 7/1999 | White | ......................... 707/10 |
| 5,953,719 A | * 9/1999 | Kleewein et al. | .............. 707/8 |
| 6,021,443 A | 2/2000 | Bracho et al. | .............. 709/241 |
| 6,049,809 A | 4/2000 | Raman et al. | ............... 707/203 |
| 6,101,527 A | 8/2000 | Lejeune et al. | ............. 709/201 |
| 6,148,299 A | * 11/2000 | Yoshimoto | ..................... 707/8 |
| 6,182,080 B1 | 1/2001 | Clements | .................... 707/102 |
| 6,243,715 B1 | * 6/2001 | Bogantz et al. | ............... 707/201 |
| 6,247,023 B1 | 6/2001 | Hsiao et al. | ................ 707/202 |
| 6,286,004 B1 | * 9/2001 | Yoshiura et al. | ............. 707/10 |
| 6,493,726 B1 | * 12/2002 | Ganesh et al. | ............. 707/201 |
| 6,510,421 B1 | * 1/2003 | Ganesh et al. | ................ 707/1 |

* cited by examiner

*Primary Examiner*—Greta Robinson
*Assistant Examiner*—Miranda Le
(74) *Attorney, Agent, or Firm*—Marcel K. Bingham; Hickman Palermo Truong & Becker LLP

(57) ABSTRACT

A data base system coordinates the execution of a distributed transaction in which a set of participant database systems participates, each of the participants executing a subtransaction of the distributed transaction. The participants include at least one database system ("incompatible database system") that does not follow a two-phase commit followed by the other participant database systems. The distributed transaction is executed as long as operations performed by the incompatible database system for the distributed transaction are read-only operations. To commit the distributed transaction, the incompatible database system aborts the subtransaction it is executing as part of the distributed transaction, while other participant database systems complete the distributed transaction using a two-phase commit to commit their respective subtransactions.

15 Claims, 4 Drawing Sheets

COORDINATING A DISTRIBUTED TRANSACTION BETWEEN PARTICIPANTS UNABLE TO FOLLOW A TWO-PHASE COMMIT

FIELD OF THE INVENTION

The present invention relates to providing atomicity of transactions on a database system, and in particular, coordinating a distributed transaction that involves participants unable to support a two-phase protocol to commit the transaction.

BACKGROUND OF THE INVENTION

One of the long standing challenges in distributed computing has been to maintain data consistency across all of the nodes in a network. Perhaps nowhere is data consistency more important than in distributed database systems, where a distributed transaction may specify updates to related data residing on different database systems. To maintain data consistency, all changes made in all database systems by the distributed transaction must be either committed or, in the event of an error, "rolled back". When a transaction is committed, all of the changes to data specified by the transaction are made permanent. On the other hand, when a transaction is rolled back, all of the changes to data specified by the transaction already made are retracted or undone, as if the changes to the data were never made.

One approach for ensuring data consistency when processing distributed transactions is referred to as "two-phase commit". According to the two-phase commit approach, one database system (the coordinating database system) is responsible for coordinating the commitment of the transaction on one or more other database systems. The other database systems that hold data affected by the transaction are referred to as participating database systems.

A two-phase commit involves two-phases, the prepare phase and the commit phase. In the prepare phase, the transaction is prepared in each of the participating database systems. When a transaction is prepared on a database system, the database is put into such a state that it is guaranteed that modifications specified by the transaction to the database data can be committed. When all participants involved in a transaction are prepared, the prepared phase ends and the commit phase may begin.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction. Finally, the participating database systems transmit a message acknowledging the commit to the coordinating database system.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

Changes made by a participating database system on behalf of a distributed database system are executed as a subtransaction. To commit a distributed transaction, a participating database commits its respective subtransaction of the distributed transaction.

The two-phase commit ensures data consistency while providing simultaneous processing of modifications to distributed databases. However, the two-phase commit does not achieve data consistency without cost. For example, participating database systems involved in a distributed transaction experience latency when waiting for other database systems to become prepared. While the participating database systems are waiting, resources affected by the distributed transaction are locked. The resources remained locked until all participating database systems are prepared, the coordinator transmits a message to the participating database systems to commit, and the participating systems commit their respective subtransactions. This leads to contention problems, because other processes waiting for the locked resources to become available are stalled until those resources are freed. A delay by any participating database system in preparing to commit increases the amount of time other processes will have to wait for locked resources.

Another problem stems from the use of two-phase commit communication protocols. A two-phase communication protocol is a set of rules, messages, and message formats followed by databases systems either coordinating or participating in a two-phase commit. One example of a two-phase commit communication protocol is LU6.2.

Many database systems do not support two-phase commit communication protocols that are compatible with those protocols used by other database systems, and are thus unable to participate with those other database systems in distributed transactions. When a database system does not support a protocol needed to participate in a distributed transaction, the database system is referred to herein as being "incompatible". A database system that supports a protocol required to participate in a distributed transaction is referred to as being "compatible" relative to that transaction.

Because participating in a distributed transaction creates the potential for latency and resource contention, participating in a distributed transaction creates security risks for participating database systems. For a participating database system, the availability of resources tied up by a distributed transaction may depend on another participating database system. Thus, some database systems limit their participation in distributed transactions to only transactions that involve "trusted" database systems.

Based on the foregoing, it is clearly desirable to provide a method that allows participation in a distributed transaction for database systems unable to support a two-phase protocol needed to participate in the distributed transaction, to provide a method that reduces the potential for latency and resource contention for participating database systems, and that reduces security risk for participating database systems.

SUMMARY OF THE INVENTION

Described herein are techniques that may be used to coordinate the execution of a distributed transaction by a set of database systems, where the set of database systems includes at least one incompatible database system. The distributed transaction is executed as long as operations performed by the incompatible system on behalf of the distributed transaction are read-only operations. To commit the distributed transaction, the incompatible database system aborts the distributed transaction, while the remaining "compatible" database systems complete the distributed transaction using a two-phase commit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for coordinating a distributed transaction are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Described herein is a technique to coordinate the execution of a distributed transaction by a set of database systems, where the set of database systems includes at least one incompatible database system. The distributed transaction is executed as long as operations performed by the incompatible system on behalf of the distributed transaction are read only operations. To commit the distributed transaction, the incompatible database system aborts the distributed transaction, while the remaining "compatible" database systems complete the distributed transaction using a two-phase commit.

The present invention is illustrated using distributed database systems that coordinate the commit of the transaction using a two-phase commit. However, techniques described herein may be applied to other types of protocols used to commit data or to ensure data consistency in distributed transactions. For example, the techniques described herein may be used to coordinate a distributed transaction executed by a set of database systems using a three-phase commit, where not all of the set of database systems support the required three phase commit communication protocol. Therefore, it is understood that the present invention is not limited to any particular technique for ensuring atomicity between database systems executing a distributed transaction.

Exemplary Distributed Database System

Figure 1:
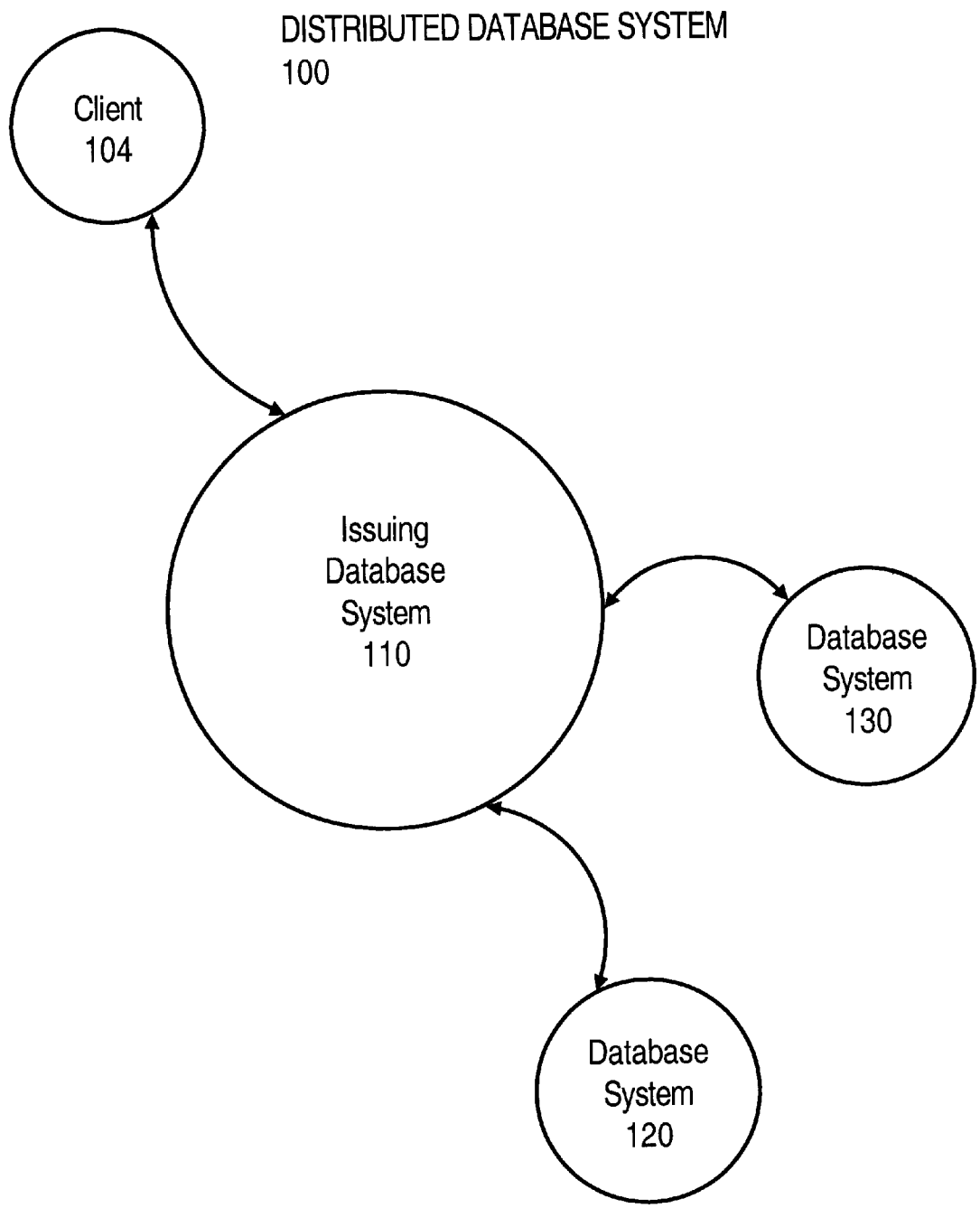
FIG. 1 is a block diagram depicting a distributed database system used to illustrate an embodiment of the present invention.

FIG. 1 shows a distributed database system upon which an embodiment of the present may be implemented. Distributed database system 100 includes an issuing database system 110, which is coupled to database systems 120 and 130. Issuing database system 110 is referred to as issuing because, using the techniques described herein, the database system receives a request from client 104 to perform data operations (i.e. read or modify) in a distributed transaction and, in response to receiving the commands transmits (or "issues") to either database system 120 or 130 the commands needed to carry out the client request with respect to database system 120 or 130. Database system 120 and 130 respond by processing the requested changes as a subtransaction.

For example, client 104 transmits a request to begin a transaction to issuing database system 110. Next, client 104 transmits a request to update data in a table that resides in database system 110. The requests of client 104 contain commands that conform to query language commands, such as Structured Query Language (SQL). In response, database system 110 initiates a transaction, and updates the requested table as part of the transaction.

Next, client 104 transmits a request to update data on a table in database system 130. To process the request, issuing database system 110 transmits a begin transaction request to database system 130, and then a request to update the table as requested by client 104. In response, database system 130 begins a subtransaction, and processes the requested updates as a subtransaction.

Admission Control

Whenever an issuing database system participating in a distributed transaction receives a request that entails data operations ("remote operations") on a remote database system ("target database system"), the issuing database system determines whether or not the requested data operations are "admitted". When the issuing database system determines that a target database system can participate in the distributed transaction to perform the remote operations, the operations are referred to as being admitted. If the issuing database system determines that the remote database system can participate in the distributed transaction to perform the requested operation, then the issuing database systems transmits the request to perform the requested operation to the remote database systems. Otherwise, the distributed transaction is aborted. According to an embodiment of the present invention, remote operations for incompatible database systems or systems unable to participate in two-phase protocol due to security or other reasons, are admitted if the remote operations entail only read operations.

Figure 2:
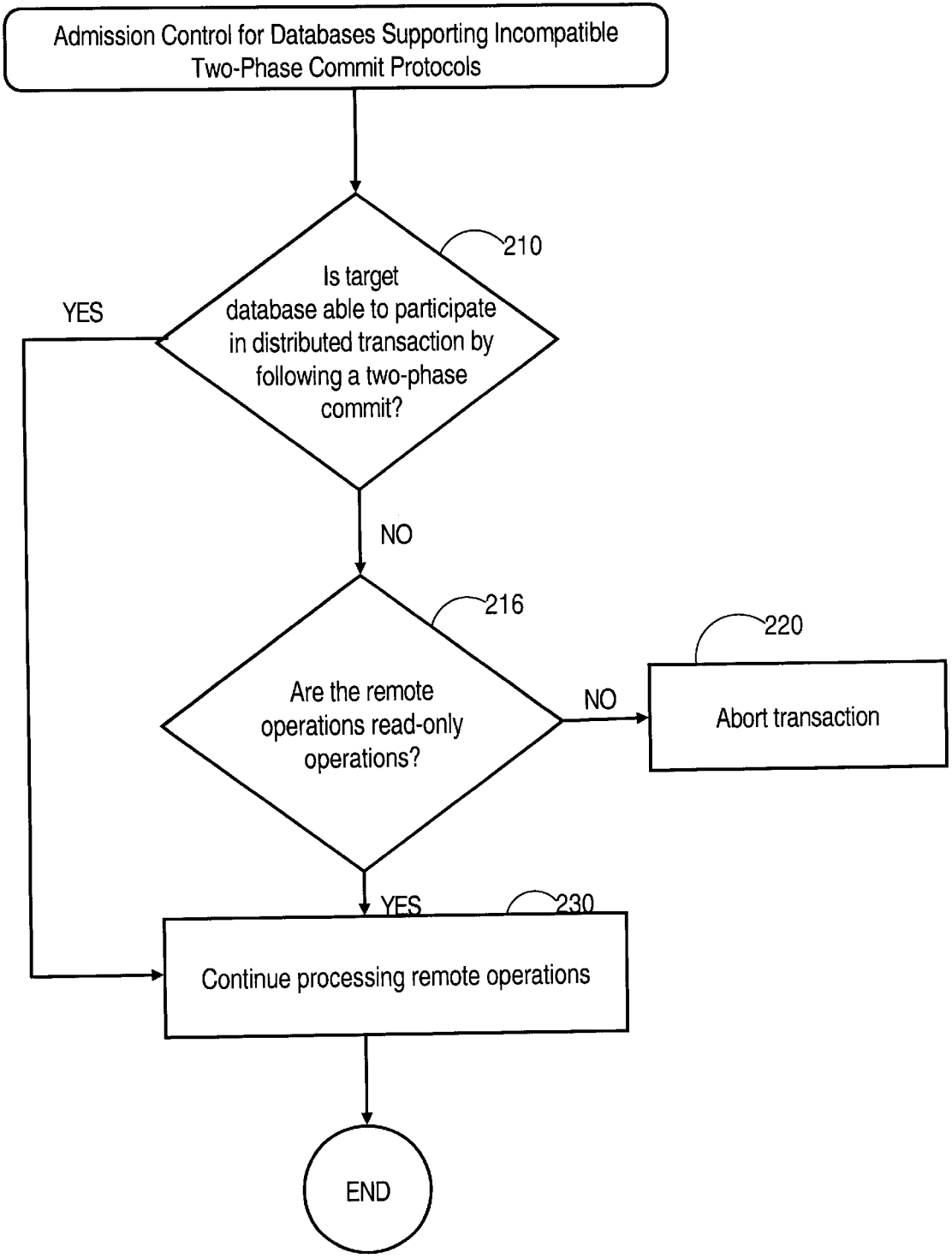
FIG. 2 is a flow chart depicting a process for admission control for a distributed transaction according to an embodiment of the present invention.

FIG. 2 is a flowchart showing steps that may be incorporated into an admission control process of an issuing database system. The process is illustrated using the distributed database system 100. For purposes of illustration, issuing database system 110 receives a BEGIN transaction command from client 104, followed by SQL statement A, which is presented below.

INSERT INTO LocalTable SELECT Col1, Col2
    FROM RemoteTable@RemoteDB130

The SQL statement is an INSERT statement that specifies that values in columns Col1 and Col2s from rows in RemoteTable are to added to table LocalTable. LocalTable resides on issuing database system 110, and RemoteTable resides on database system 130. RemoteDB130 is an identifier used by issuing database system 110 to identify database system 130. After receiving and analyzing the SQL statement, issuing database system 110 determines that the statement requires remote operations at database system 130, and in particular, read operations that extract values in Col1, Col2 from RemoteTable. Issuing database system 110 then initiates the process of admission control for the remote operations, which, in one embodiment, involves performing the steps shown in FIG. 2.

Referring to FIG. 2, at step 210, issuing database system 110 determines whether the target database system is able to participate by following a two-phase commit. As mentioned before, a target database system may not be able to participate by following a two-phase commit for reasons such as (1) the target system does not support the two-phase commit protocol, or (2) participation using the two-phase protocol poses security risks to resources of the target database system. This determination is made based on information, obtained by issuing database system 110, about the ability of a target database system to follow a two-phase commit protocol.

The information may be static information, such as configuration information stored in database system 110. For example, issuing database system 110 may store such information in configuration data about remote databases with which an issuing database system may interact. The information may indicate not only what two-phase protocol a remote database system follows, but whether or not it follows a compatible two-phase protocol, or whether the remote database system participates in distributed transactions requiring the remote database system to follow a two-phase protocol. Issuing database system 110 examines this information to make the determination at step 210.

Alternately, issuing database system 110 may obtain dynamic information about the ability of a target database system to follow a two-phase commit protocol. For example, database system 110 connects to a target database system and receives information about the ability of the target database system to follow a two-phase commit protocol from the target database system. Issuing database system 110 examines this information to make the determination at step 210. It should be understood, that the present invention is not limited to any particular technique for making the determination at step 210, or any particular technique for obtaining information used to make the determination.

If issuing database system 110 determines that the target database system is able to participate by following a two-phase commit, then control flows to step 230, where issuing database system 110 continues processing the remote operations. Such processing may entail performing further admission control processing, and issuing commands to the target database system to execute the remote operations.

However, if issuing database system 110 determines that the target database system is not able to participate by following a two-phase commit, then control flows to step 216. In the current illustration, issuing database system 110 determines that the target database system 130 is not able to participate by following a two-phase commit. Therefore, control flows to step 216.

At step 216, the issuing database system 110 determines whether the remote operations are read-only operations. If issuing database system 110 determines that the remote operations are read-only operations, then control flows to step 230. Otherwise, access control ends, and control flows to step 220. At step 220, issuing database system 110 aborts the distributed transaction.

While the present example uses an insert statement, the present invention is not limited to processing any particular type of SQL command or statement, or statements conforming to any particular database query language. For example, issuing database system 110 may receive a statement that contains only a SELECT statement for a target database system. Therefore, it is understood, that the present invention is not limited to processing any particular kind of statement or database query language.

Coordinating the Commit of a Distributed Transaction

Figure 3:
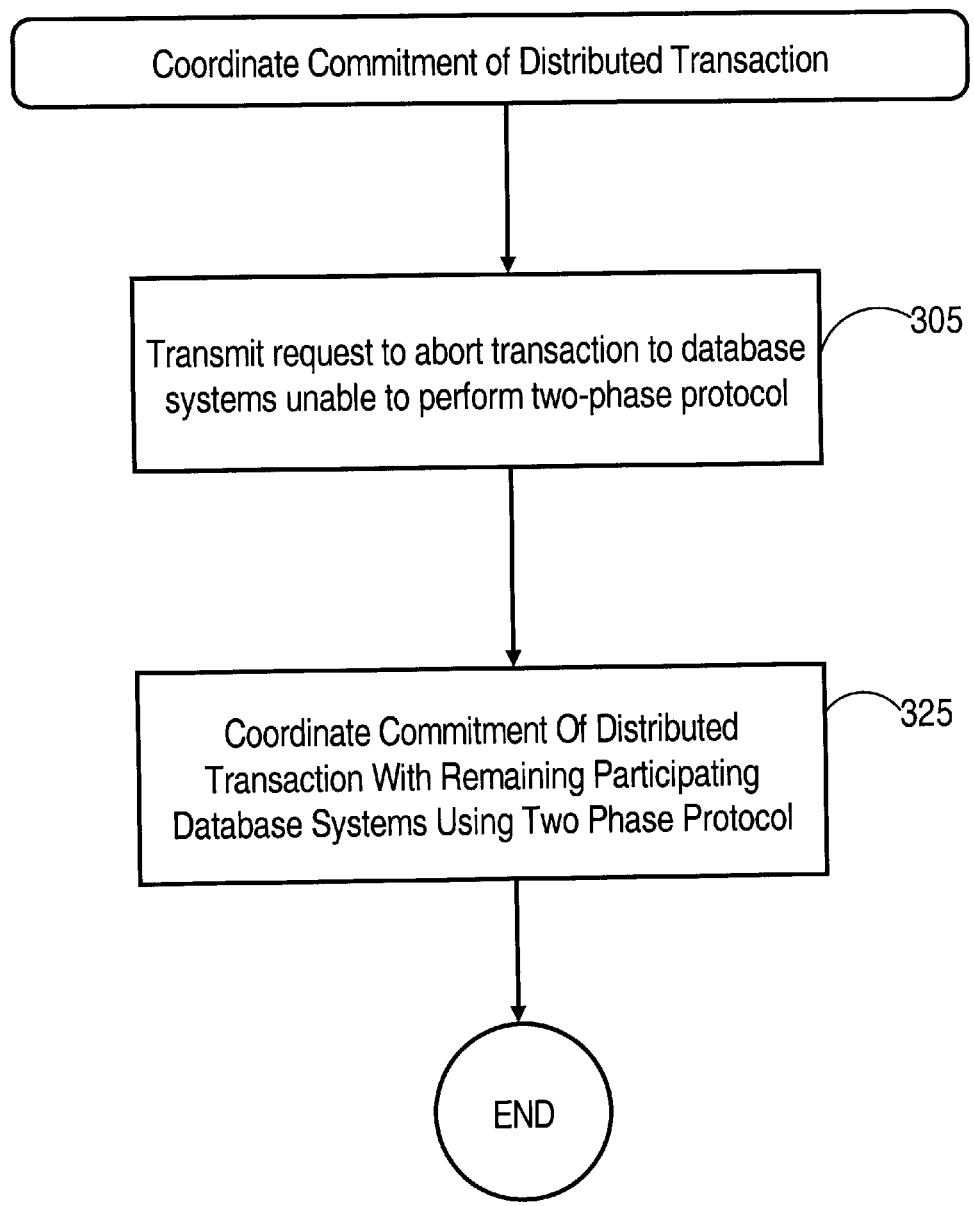
FIG. 3 is a flow chart depicting a process for coordinating the commitment of a distributed transaction according to an embodiment of the present invention.

FIG. 3 shows the steps performed for coordinating a commit of a distributed transaction which includes database systems unable to participate in a two-phase commit of the distributed transaction. The steps are performed by the coordinating database system for a distributed transaction. In many database systems, a coordinating database system is selected before initiating the process of committing a distributed transaction, and, therefore, the coordinating database system is not necessarily the issuing database system. However, for purposes of exposition, the steps in FIG. 3 are illustrated using issuing database system 110 as the coordinating database system.

Referring to FIG. 3, at step 305, the coordinating database system transmits a request to abort the distributed transaction to the database systems unable to participate in a two-phase commit of the distributed transaction. In the current example, issuing database system 110 transmits a request to abort the transaction to database system 130. In response, database system 130 aborts its respective subtransaction.

At step 325, issuing database system 110 coordinates the commitment of the distributed transaction with the remaining participating database systems using a two-phase protocol.

Advantages

One advantage of the techniques described herein is the ability to include the participation of incompatible database systems in distributed transactions. This permits the execution of distributed transactions between database systems that could not otherwise be executed using conventional techniques for managing distributed transactions. A distributed transaction can be executed between database systems that not only include an incompatible database system, but that also include a database that would not otherwise participate because of security risks to resources of the database system.

Furthermore, techniques described herein offer advantages that are not limited to distributed transactions involving only database systems unable to participate because of two-phase commit compatibility or security issues. For example, any participating database system in a distributed transaction, and not just those that are that unable follow a two-phase commit, may be instructed to abort the transaction if their respective subtransaction is limited to read-only operations. This would allow a database systems to free up any resources that tied up by a distributed transaction at an earlier stage of the distributed transaction.

Hardware Overview

Figure 4:
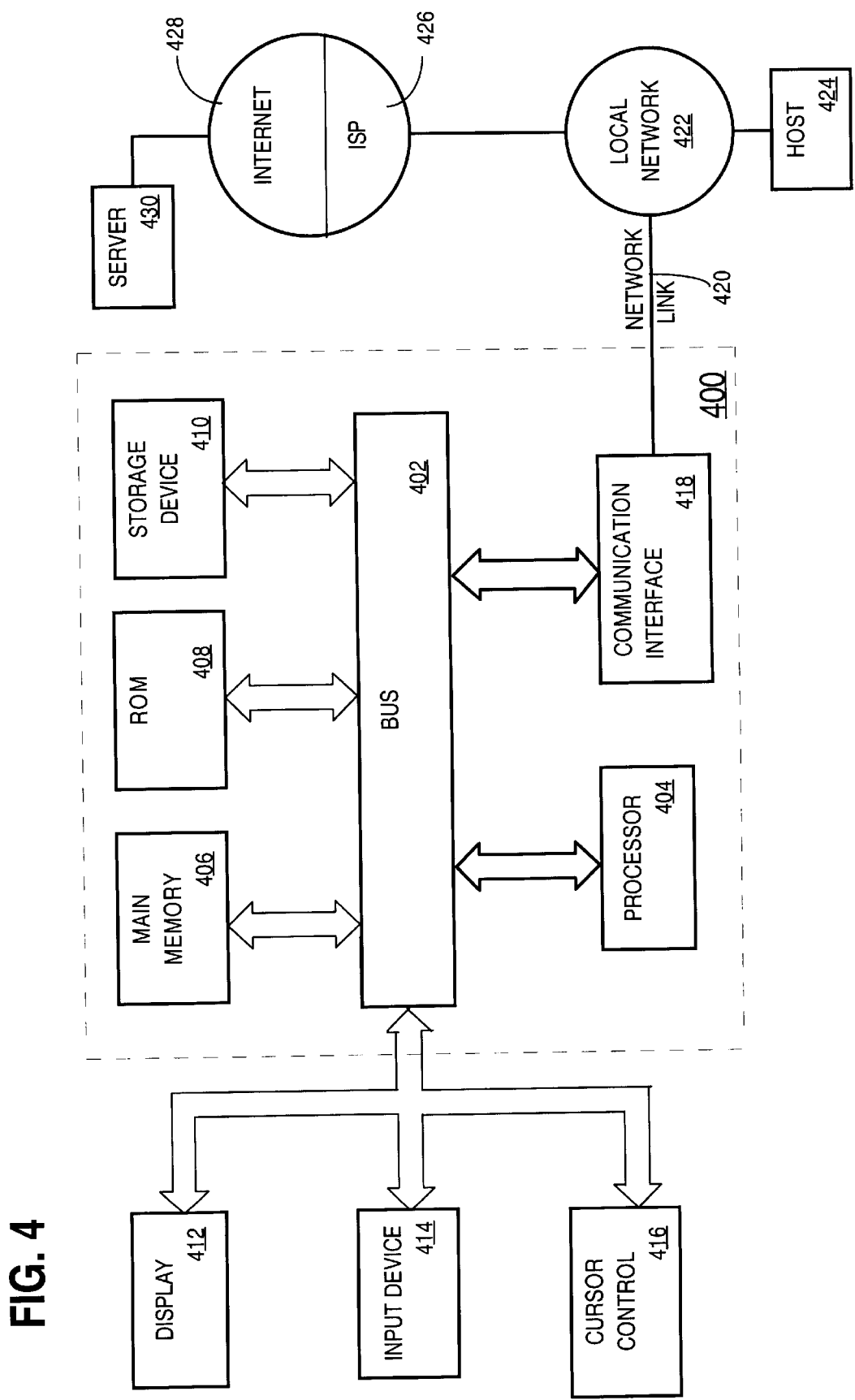
FIG. 4 is a flow chart depicting a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418. may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of coordinating a distributed transaction between database systems that include a first database system, the method comprising the steps of:

determining whether first operations to be performed by said first database system as a subtransaction of the distributed transaction satisfy one or more criteria;

wherein said one or more criteria include that said first operations do not change data managed by said first database system and entail only read operations;

causing said first database system to participate in said distributed transaction by executing said subtransaction;

coordinating commitment of said distributed transaction by performing one or more steps that include the step of causing the first database system to abort said subtransactions when said first operations satisfy said one or more criteria; and wherein:

the commitment of said distributed transaction is coordinated using one or more two-phase commit protocols not supported by said first database system, and after determining whether said first operations satisfy one or more criteria, said distributed transaction is allowed to proceed only if said first operations satisfy said one or more criteria.

2. The method of claim 1, wherein the step of causing said first database system to participate in said distributed transaction includes transmitting a request to begin said subtransaction to said first database system.

3. The method of claim 1, wherein the step of coordinating commitment of said distributed transaction includes one or more other database systems cooperating to commit said distributed transaction using a particular two-phase commit protocol.

4. A method of coordinating distributed transactions, the method comprising the steps of:

receiving a request to commit a distributed transaction being executed by a plurality of database systems that include a first database system, wherein said first database system is executing a subtransaction of the distributed transaction;

in response to receiving said request to commit the transaction, coordinating commitment of said distributed transaction by performing steps that include:

causing one or more other database systems participating in said distributed transaction to commit respective subtransactions of said distributed transaction, and causing said first database system to abort said subtransaction according to a protocol for committing distributed transactions; and wherein said one or more other database systems and said first database system participates in said distributed transaction according to at least one two-phase commit protocol.

5. The method of claim 4, wherein the step of causing said first database system to abort includes transmitting a message to said first database system that requests that said first database system abort said subtransaction.

6. A computer-readable medium carrying one or more sequences of instructions for a distributed transaction between database systems that include a first database system, wherein execution of the one or more sequences of instructions by one or more processors causes the one or more processors to perform the steps of:

determining whether first operations to be performed by said first database system as a subtransaction of the distributed transaction satisfy one or more criteria;

wherein said one or more criteria include that said first operations do not change data managed by said first database system and entail only read operations;

causing said first database system to participate in said distributed transaction by executing said subtransaction;

coordinating commitment of said distributed transaction by performing one or more steps that include the step of causing the first database system to abort said subtransaction when said first operations satisfy said one or more criteria; and wherein:

the commitment of said distributed transaction is coordinated using one or more two-phase commit protocols not supported by said first database system, and after determining whether said first operations satisfy one or more criteria, said distributed transaction is allowed to proceed only if said first operations satisfy said one or more criteria.

7. The computer-readable medium of claim 6, wherein the step of causing said first database system to participate in said distributed transaction includes transmitting a request to begin said subtransaction to said first database system.

8. The computer-readable medium of claim 6, wherein the step of coordinating commitment of said distributed transaction includes one or more other database systems cooperating to commit said distributed transaction using a particular two-phase commit protocol.

9. A computer-readable medium carrying one or more sequences of instructions for coordinating distributed transactions, wherein execution of the one or more sequences of instructions by one or more processors causes the one or more processors to perform the steps of:

receiving a request to commit a distributed transaction being executed by a plurality of database systems that include a first database system, wherein said first database system is executing a subtransaction of the distributed transaction;

in response to receiving said request to commit the transaction, coordinating commitment of said distributed transaction by performing steps that include:

causing one or more other database systems participating in said distributed transaction to commit respective subtransactions of said distributed transaction, and causing said first database system to abort said subtransaction according to a protocol for committing distributed transactions; and wherein said one or more other database systems and said first database system participates in said distributed transaction according to at least one two-phase commit protocol.

10. The computer-readable medium of claim 9, wherein the step of causing said first database system to abort includes transmitting a message to said first database system that requests that said first database system abort said subtransaction.

11. A database system, wherein said database system is configured to participate in execution of a distributed transaction that includes at least one other database system;

said database system is configured to determine whether first operations to be performed by said at least one other database system as a subtransaction of the distributed transaction satisfy one or more criteria;

wherein said one or more criteria include that said first operations do not change data managed by said first database system and entail only read operations;

said database system is configured to cause said at least one other database system to participate in said distributed transaction by executing said subtransaction;

said database system is configured to coordinate commitment of said distributed transaction by performing one or more steps that include the step of causing the at least one other database system to abort said subtransaction when said first operations satisfy said one or more criteria; and wherein:

the commitment of said distributed transaction is coordinated using one or more two-phase commit protocols not supported by said first database system, and said distributed transaction is allowed to proceed after said database system determines whether said first operations satisfy one or more criteria only if said first operations satisfy said one or more criteria.

12. The database system of claim 11, wherein said database system is configured to cause said at least one other database system to participate in said distributed transaction by performing one or more steps that include transmitting a request to begin said subtransaction to said at least one other database system.

13. The database system of claim 11, wherein said database system is configured to coordinate commitment of said distributed transaction using a two-phase commit protocol with one or more database systems other than said at least one other database system.

14. A database system, wherein said database system is configured to receive a request to commit a distributed transaction being executed by a plurality of database systems that include at least one other database system, wherein said at least one other database system is executing a subtransaction of the distributed transaction; and said database system is configured to coordinate commitment of said distributed transaction in response to receiving said request to commit the transaction by performing steps that include:

causing one or more other database systems participating in said distributed transaction to commit respective subtransactions of said distributed transaction, and causing said first database system to abort said subtransaction according to a protocol for committing distributed transactions; and wherein said one or more other database systems and said first database system participates in said distributed transaction according to at least one two-phase commit protocol.

15. The database system of claim 14, wherein the step of causing said fist database system to abort includes transmitting a message to said first database system that requests that said first database system abort said subtransaction.

* * * * *

UNITED STATES PATENT AND TRADEMARK OFFICE
CERTIFICATE OF CORRECTION

PATENT NO. : 6,772,176 B1
DATED : August 3, 2004
INVENTOR(S) : Saha et al.

It is certified that error appears in the above-identified patent and that said Letters Patent is hereby corrected as shown below:

Title page,
Item [57], ABSTRACT,
Line 1, "A data base system" should read -- A database system --.

Column 9,
Line 7, "subtransactions" should read -- subtransaction --;

Column 12,
Line 25, "fist" should read -- first --.

Signed and Sealed this

Sixteenth Day of November, 2004

JON W. DUDAS
*Director of the United States Patent and Trademark Office*